(12) United States Patent
Kimura (10) Patent No.: US 7,871,255 B2
(45) Date of Patent: Jan. 18, 2011

(54) INJECTION MOLDING MACHINE

(75) Inventor: Seiji Kimura, Itami (JP)

(73) Assignee: Pascal Engineering Corporation, Hyogo (JP)

( * ) Notice: Subject to any disclaimer, the term of this patent is extended or adjusted under 35 U.S.C. 154(b) by 21 days.

(21) Appl. No.: 12/226,176

(22) PCT Filed: Apr. 28, 2006

(86) PCT No.: PCT/JP2006/308992

§ 371 (c)(1),
(2), (4) Date: Oct. 8, 2008

(87) PCT Pub. No.: WO2007/125596

PCT Pub. Date: Nov. 8, 2007

(65) Prior Publication Data

US 2009/0169674 A1    Jul. 2, 2009

(51) Int. Cl.
*B29C 33/32* (2006.01)
(52) U.S. Cl. .................. 425/3; 425/186; 425/192 R; 425/195
(58) Field of Classification Search .............. 425/3, 425/186, 192 R, 195
See application file for complete search history.

(56) References Cited

U.S. PATENT DOCUMENTS

| 4,462,783 A | * | 7/1984 | Hehl | 425/186 |
| 4,529,371 A | * | 7/1985 | Nickley | 425/186 |
| 6,010,324 A | * | 1/2000 | Oshiro et al. | 425/186 |

FOREIGN PATENT DOCUMENTS

| JP | 5-24330 | 2/1993 |
| JP | 5-269804 | * 10/1993 |
| JP | 2001-88133 | 4/2001 |
| JP | 2003-326531 | 11/2003 |
| JP | 2005-169840 | 6/2005 |
| JP | 2005-246634 | 9/2005 |

* cited by examiner

*Primary Examiner*—James Mackey
(74) *Attorney, Agent, or Firm*—Jordan and Hamburg LL (57) ABSTRACT

The injection molding machine has a fixed platen and a movable platen for fixing a pair of molds; a pair of clamp plates mounted to the fixed platen and the movable platen, respectively, and having a fixation surface for mold fixation, respectively; and magnetic force generation mechanisms for generating a magnetic force for fixing the molds to the fixation surfaces. An air-gap formation mechanism is provided at least in one of the clamp plates for automatically forming air-gaps between the fixation surfaces and the molds in association with the movement start of the movable platen while the magnetic force generation mechanisms are inactivated for detaching the molds from the fixation surfaces.

7 Claims, 10 Drawing Sheets

INJECTION MOLDING MACHINE

TECHNICAL FIELD

The present invention relates to an injection molding machine, and particularly relates to one with a configuration where clamp plates where magnetic force generation mechanisms are incorporated in a fixed platen and a movable platen for fixation of a pair of molds, respectively, and the molds are designed to be fixed by a magnetic force, and when detaching the molds, they can be easily separated from the clamp plates.

BACKGROUND TECHNOLOGY

Conventionally, in an injection molding machine, molds (a fixed mold and a movable mold) are fixed to a fixed platen and a movable platen, respectively, and the movable platen is driven to move so as to come closer to or separate from the fixed platen, and mold shutting and mold opening of the molds are accomplished. While the molds are shut, a molten synthetic resin is injected into cavities inside the molds and an article to be injection-molded is molded, and then, the molds are opened and the injection-molded article is ejected by an ejector mechanism.

Here, fixation of the molds to the fixed platen and the movable platen in the injection molding machine is often performed using multiple bolts or hydraulic clamping devices. However, in recent years, a mold fixation device where a magnet platen (adhesion plate) is attached to the fixed platen and the movable platen, respectively, and the molds are adhered and fixed to the fixation surfaces of the magnet platens by a magnetic force generated by the magnet platen is about to be practically used.

In the injection molding machine of Patent Literature 1, a large-sized magnet platen made of a permanent magnet is provided to the fixed platen and the movable platen of the injection molding machine, respectively.

In the injection molding machine of Patent Literature 2, a mold adhesion platen is attached to the movable platen and an assembly ring is fixed to a center portion of this mold adhesion platen, and many lateral cylindrical alnico magnets are arranged in the mold adhesion platen, and a large coil is wound around the circumference of the alnico magnets, respectively, and a large-sized circular plate is arranged in front of the alnico magnets and externally fitted into the assembly ring.

In the injection molding machine of Patent Literature 3, the configuration is such that a clamp plate where multiple magnet units are incorporated is fixed to the fixed platen and the movable platen, respectively, and the molds are fixed to the fixation surfaces of the clamp plates by the magnetic force generated by the multiple magnet units, respectively.

Each magnet unit has a steel block, multiple permanent magnets arranged around the circumference of this steel block, an alnico magnet arranged at the rear surface side of the steel block and a coil wound around the circumference of this alnico magnet, and the direction of a magnetic field of the alnico magnet can be switched to the opposite direction according to the direction of power distribution supplied to the coil. In the clamped state to adhere the molds, a magnetic field where the mold become a portion of a magnetic path is generated, and in the unclamped state to release the fixation of the molds, another magnetic field where a magnetic circuit not using the mold as a portion of the magnetic path is generated by switching the direction of the magnetic field of the alnico magnet.

In other words, in order to convey the mold to the injection molding machine, a method where multiple in-platen rollers are provided in the lower portions of the fixed platen and the movable platen, respectively, and when conveying the molds, both flanges of these molds are accepted by the in-platen rollers at the both sides, and these are moved on the in-platen rollers is adopted.

However, with the injection molding machine without the in-platen rollers, another method where a mold is hung with a crane and the mold is conveyed in between the fixed platen and the movable platen from the upper side of the injection molding machine is also adopted.

Patent Literature 1: Japanese Utility Model Application H5-24330

Patent Literature 2: Japanese Patent Application Laid-Open No. 2001-88133

Patent Literature 3: Japanese Patent Application Laid-Open No. 2005-169840

DISCLOSURE OF THE INVENTION

Problem to be Solved by the Invention

In the injection molding machine equipped with the mold fixation device as described in Patent Literature 3, even in the state where multiple magnet units are switched to an inactive state not to adhere a mold in order to exchange the mold, a magnetic flux throughout the mold and clamp plates remains. Consequently, in the case of a mold made from alloy steel with a strong magnetic property and a great coercive force, because the residual magnetic flux is strong, there is a problem that it takes a lot of work and time to separate the mold from the clamp plates.

In particular, in the case of a comparatively small mold, because the mold is strongly adhered to the clamp plates, even though the movable platen is moved to the mold-opening direction, because the moment to the separation direction by its own weight of the mold is also small, it is difficult to separate the molds from the movable platen and the fixed platen, and there is a problem that it takes a lot of labors and time for the separation.

The objective of the present invention is to provide an injection molding machine where clamp plates incorporating magnetic force generation mechanisms are mounted to the fixed platen and the movable platen, respectively, and where a mold can be easily separated from the clamp plates at the time of carrying out from the clamp plates.

Means for Solving the Problem

The injection molding machine according to the present invention is comprising: a fixed platen and a movable platen for fixing a pair of molds; a pair of clamp plates mounted to the fixed platen and the movable platen, respectively, and having a fixation surface for mold fixation, respectively; and magnetic force generation mechanisms for generating a magnetic force for fixing the molds to the fixation surfaces, wherein an air-gap formation means for automatically forming an air-gap between the fixation surface and the molds in association with a movement start of the movable platen while the magnetic force generation mechanisms are inactivated for detaching the molds from the fixation surfaces is provided at least in one of the clamp plates.

Here, in a modified injection molding machine is comprising: multiple first in-platen rollers for mold conveyance projecting outward from the fixation surface provided on the lower portion of the clamp plate mounted to the fixed platen; and multiple second in-platen rollers for mold conveyance projecting outward form the fixation surface provided on the lower portion of the clamp plate mounted to the movable platen; and the air-gap formation means has a configuration where conveyance surfaces of the second in-platen rollers are set lower than those of the first in-platen rollers by a predetermined small distance; while the magnetic force generation mechanisms are inactivated, air-gaps are automatically formed between both fixation surfaces and the molds via mold's own weight.

Advantages of the Invention

According to the injection molding machine of the present invention, the air-gap formation means is provided in at least one of the clamp plates, and in order to detach the molds from the fixation surfaces, air-gaps are automatically formed between the fixation surfaces and the molds by the air-gap formation means in association with the movement start of the movable platen while the magnetic force generation mechanisms provided in the clamp plates are inactive.

Therefore, since the magnetic path of the residual magnetic flux is divided by the air-gaps between the clamp plates and the molds, the adhesion force to adhere the mold to the clamp plate becomes remarkably weak, and the molds can be easily separated from the clamp plates.

According to the modified injection molding machine, when the used mold is carried out of the injection molding machine, the magnetic force generation mechanisms are inactivated, and the movable platen is slightly moved toward the direction to separate it from the fixed platen, and if the lower ends of the molds are supported by the first and second in-platen rollers, because the conveyance surfaces of the second in-platen rollers fitted on the movable platen are set lower than the conveyance surfaces of the first in-platen rollers fitted on the fixed platen by a predetermined small distance, the molds become in the tilted posture at the movable platen side via the mold's own weight in association with the movement start of the movable platen. Therefore, since air-gaps are formed between the molds and both clamp plates, the molds can be easily separated from both clamp plates as similar to the present invention.

DESCRIPTION OF SYMBOLS 1, 1A injection molding machine
2 fixed platen
3 movable platen
13 magnet unit
30, 30A, 30B air-gap formation mechanism
31 accommodation hole
32 movable member
33 compression spring
34 bolt
40, 41 first and second in-platen roller

BEST MODE FOR IMPLEMENTING THE INVENTION

In order to accomplish the objective, when the magnetic force generation mechanisms in the clamp plates are inactivated when detaching a joined mold, the air-gap formation means for automatically forming air-gaps between the fixation surfaces of the clamp plates and the molds is provided.

Embodiment 1

First, an injection molding machine 1 will be described.

Figure 1:
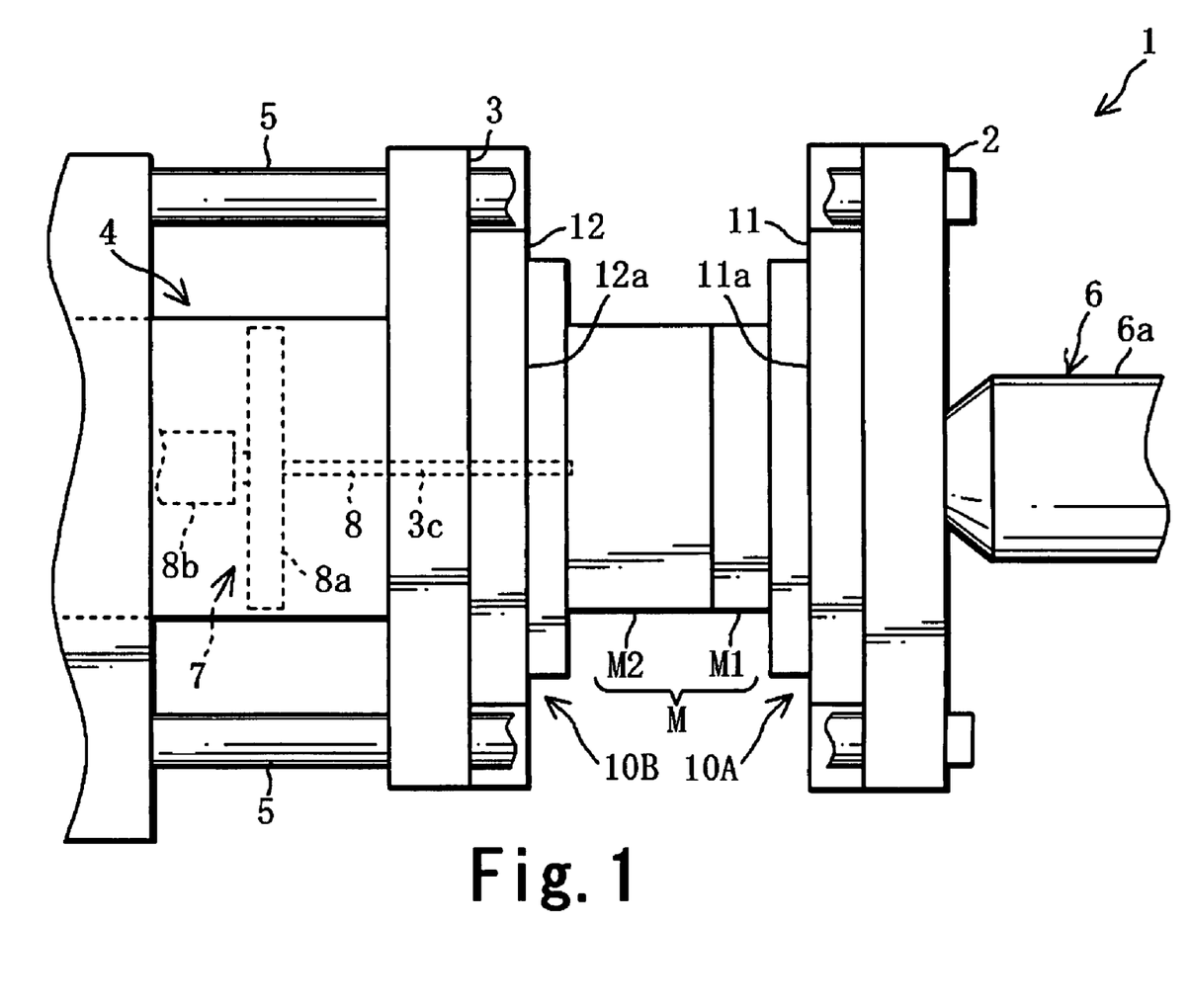
FIG. 1 is a front view of the main part of the injection molding machine and a joined mold of Embodiment 1.

As shown in FIG. 1, the injection molding machine 1 is equipped with a fixed platen 2 and a movable platen 3 facing from each other for fixing a mold M (a fixed mold M1 and a movable mold M2), a movable platen driving mechanism 4 having a hydraulic cylinder (or a drive motor) for driving the movable platen 3 to the direction to come closer/separate to/from the fixed platen 2 for mold-shutting and mold-opening, four guide rods 5 for guiding and supporting the movable platen 3 to be movably to the direction to come closer/separate, an injection mechanism 6 having an injection cylinder 6a for supplying a molten synthetic resin to the cavity within the mold M in the mold-shut condition, and an ejecting mechanism 7 for ejecting a molded article from the movable mold M2.

In the case of injection-molding by this injection molding machine 1, the movable platen 3 is driven to the direction coming closer to the fixed platen 2 by the movable platen drive mechanism 4, and the movable mold M2 is pressed to the fixed mold M1 and the mold M become in the mold-shut state, and a molten synthetic resin is injected into the mold M from the end of the injection cylinder 6a and the article is molded. Then, the movable platen 3 is driven to the direction to be separated from the fixed platen 2 by the movable platen drive mechanism 4, and the movable mold M2 is separated from the fixed mold M1 and the mold M become in the mold-opened state. The injection-molded article is ejected from the movable mold M2 by the ejecting mechanism 7.

The ejecting mechanism 7 is equipped with an ejector pin 8, an ejector plate 8a coupled with the proximate end of this ejector pin 8, and a liquid pressure cylinder 8b (for example, an air cylinder) for driving the ejector pin 8 back and forth via this ejector plate 8a, and the ejector pin 8 is inserted into an ejector pin hole 3c formed in the center of the movable platen 3.

Figure 2:
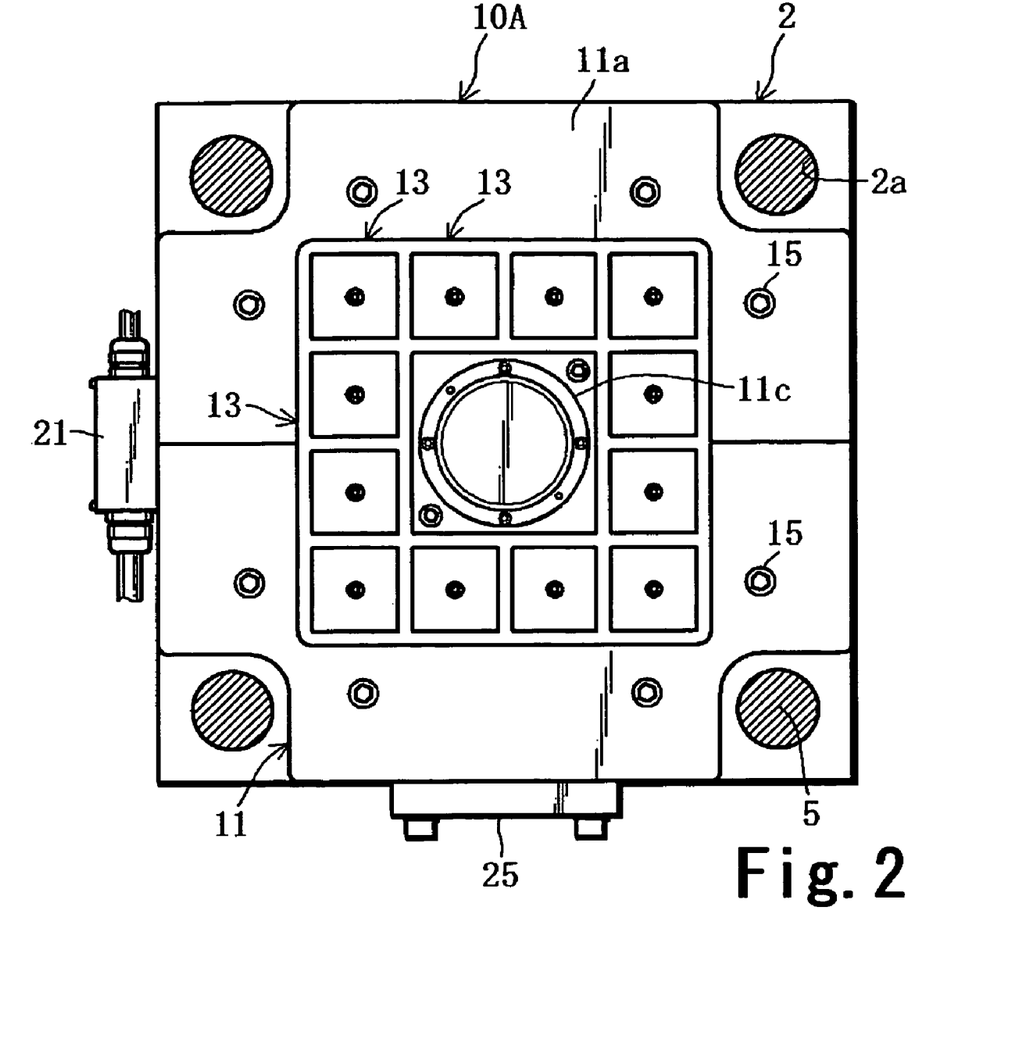
FIG. 2 is a side view of the movable platen and the clamp plate.
Figure 3:
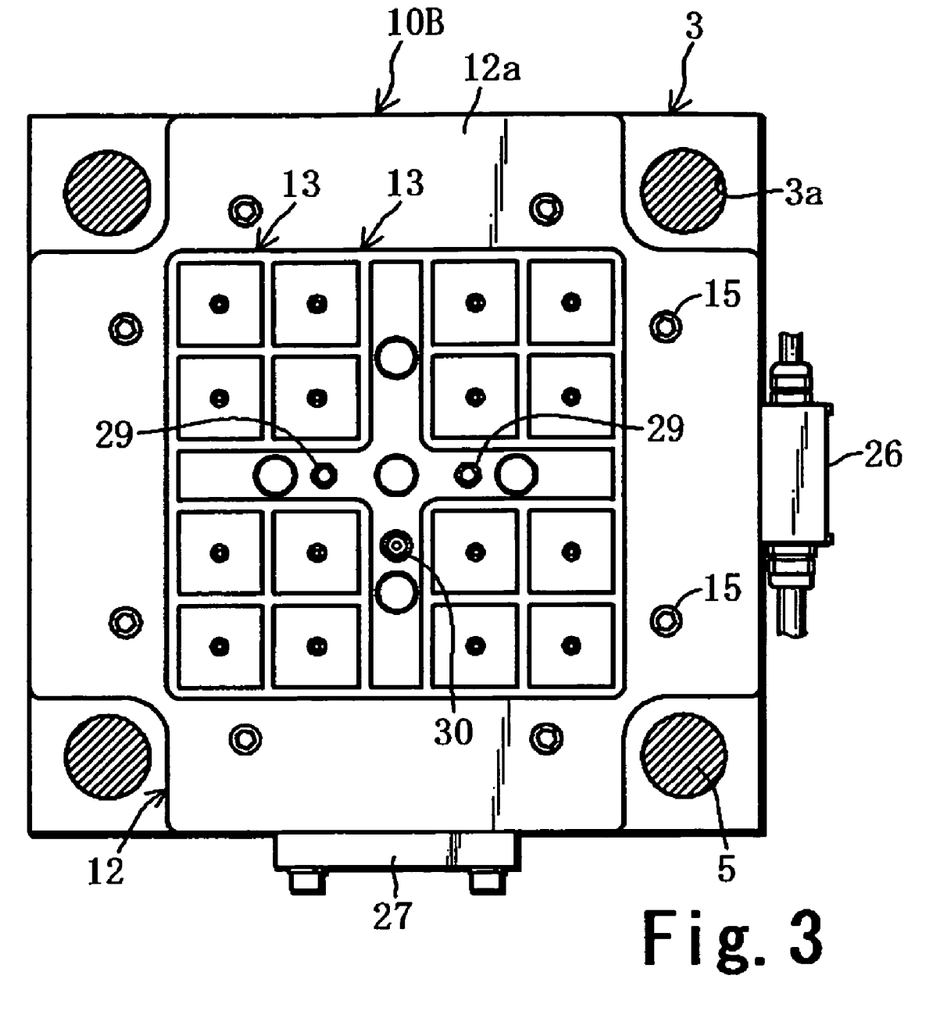
FIG. 3 is a side view of the fixed platen and the clamp plate.

As shown in FIG. 1 to FIG. 3, the fixed platen 2 and the movable platen 3 are formed to be square in side view, respectively, and the four guide rods 5 are fixed in the state to be inserted into insertion holes 2a in the vicinity of four corners of the fixed platen 2, respectively, and the four guide rods 5 are inserted into insertion holes 3a in the vicinity of the four corners of the movable platen 3 to be slidable, respectively, and the movable platen 3 is guided to the direction to come closer/separate to/from the fixed platen 2.

Next, a mold fixation device 10A for fixing the fixed mold M1 to the fixed platen 2 and a mold fixation device 10B for fixing the movable mold M2 to the movable platen 3 will be described.

As shown in FIG. 1 to FIG. 3, the mold fixation device 10A is equipped with a clamp plate 11 having a fixation surface 11a for fixing the mold M1 to the fixed platen 2 and multiple magnet units 13 that are fitted in the clamp plate 11, and that generate an adhesion force for fixing the mold M1 to the fixation surface 11a by the magnetic force. Furthermore, the multiple magnet units 13 are equivalent to "magnetic force generation mechanisms".

The mold fixation device 10B is equipped with a clamp plate 12 having a fixation surface 12a for fixing the mold M2 to the movable platen 3 and the multiple magnetic units 13 that are fitted in the clamp plate 12, and that generate an adhesion force for fixing the mold M2 to the fixation surface 12a by the magnetic force. Furthermore, the multiple magnet units 13 are equivalent to "magnetic force generation mechanisms".

The clamp plate 11 is a thick steel plate made from a magnetic material, which has substantially the same size as the fixed platen 2, and substantially-square portions corresponding to the four corners of the fixed platen 2 are removed. The clamp plate 11 is fixed to the platen surface of the fixed platen 2 by multiple bolts 15.

The clamp plate 12 is a thick steel plate made from a magnetic material, which has substantially the same size as the movable platen 3, and substantially-square portions corresponding to the four corners of the movable platen 3 are removed. The clamp plate 12 is fixed to the platen surface of the movable platen 3 by the multiple bolts 15.

As shown in FIG. 1 and FIG. 2, in the clamp plate 11, a pair of connector boxes are mounted to the rear end and a location ring 11c is mounted in the center portion, and an anti-falling block 25 for preventing the mold M1 from falling is fixed to the lower end. The pair of connector boxes 21 are to connect electric wires from a control panel for supplying an electric current to the multiple magnet units 13. The location ring 11c is to fit the location ring (not shown) of the mold M1 and to easily position the mold M1 to the fixation surface 11a.

As shown in FIG. 1 and FIG. 3, in the clamp plate 12, a pair of connector boxes 26 are mounted to the rear end, and an anti-falling block 27 for preventing the mold M2 from falling is fixed to the lower end and a pair of ejector pin holes 29 are mounted in the center portion. The pair of connector boxes 26 and the anti-falling block 27 have similar functions to those mounted in the clamp plate 11 of the fixed platen 2, respectively. Furthermore, hanging rings (not shown) are attached to the upper ends of the fixed mold M1 and the movable mold M2, and the molds M1 and M2 are hung and conveyed.

Next, the magnet unit 13 will be described in detail.

As described above, the multiple magnet units 13 are fitted in the clamp plates 11 and 12 with the different arrangements, and since the magnet units 13 have basically the same structure, the magnet units 13 fitted in the clamp plate 12 will be described later based upon FIG. 4 to FIG. 7. Furthermore, the arrangement of the multiple magnet units 13 can be appropriately changed based upon the shape and size of the clamp plate 11 and shape and size of the mold M to be fixed.

As shown in FIG. 2, the three magnet units 13 are arranged to be adjacent-state on the left, right, top and bottom directions and regarded as a set of magnet unit group, and four sets of magnet unit group, a total of twelve magnet units 13 are arranged at a point-symmetry position regarding a center of the clamp plate 11 of the fixed plate 2.

As shown in FIG. 3, the four magnet units 13 are arranged to be adjacent-state on the left, right, top and bottom directions and regarded as a set of magnet unit group, and four sets of magnet unit group, a total of sixteen magnet units 13 are arranged at a point-symmetry position regarding a center in the clamp plate 12 of the movable plate 3.

Figure 4:
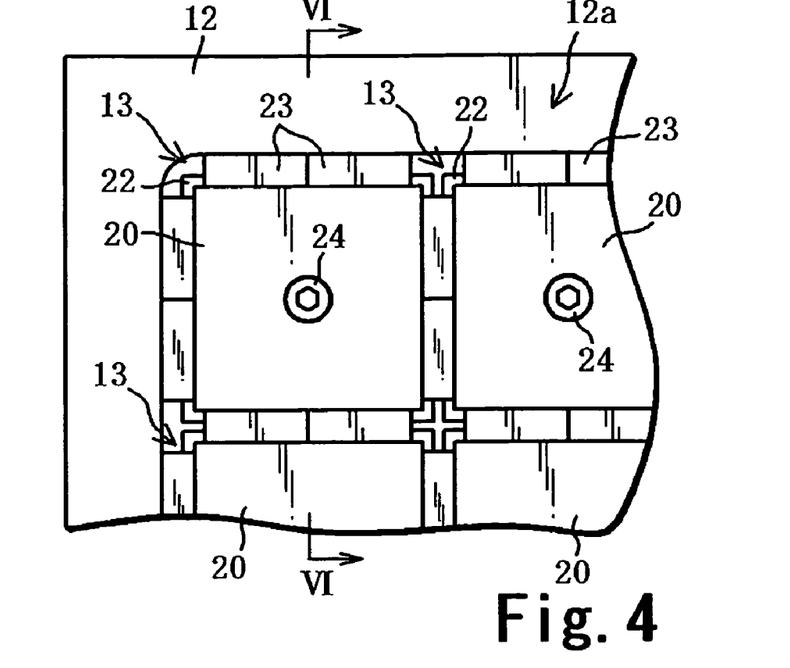
FIG. 4 is a side view showing the configuration of the magnet units.
Figure 5:
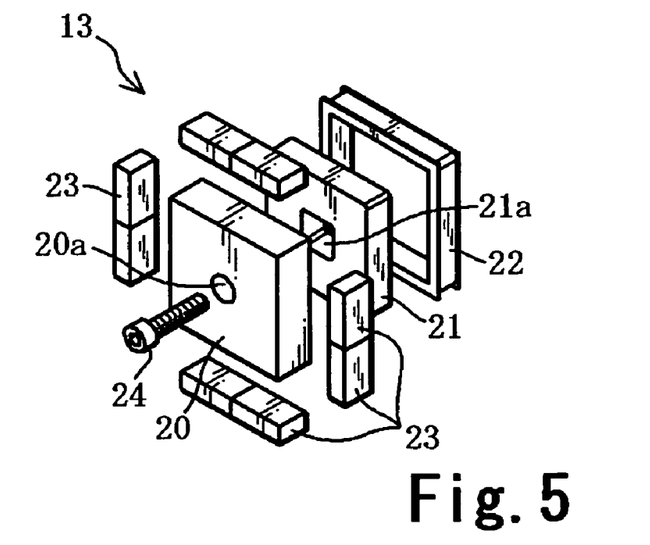
FIG. 5 is an disassembled perspective view of the magnet unit.
Figure 6:
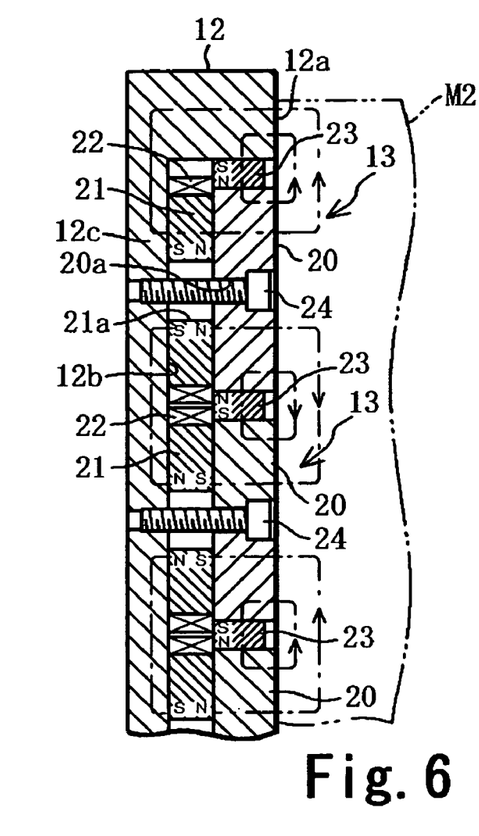
FIG. 6 is a cross sectional view of the clamp plate (operating condition) of the movable platen.

Next, the magnet unit 13 incorporated into the clamp plate 12 will be described in detail. As shown in FIG. 4 to FIG. 6, the magnet unit 13 has a steel block 20 made from a magnet material forming a portion of the fixation surface 12a, an alnico magnet 21 behind the steel block 20, a coil 22 wound around the alnico magnet 21, and permanent magnets 23 formed of multiple (for example, eight) magnets arranged so as to surround the steel block 20, and the permanent magnets 23 in between the adjacent magnet units 13 are also used as the permanent magnets 23 of these magnet units 13.

The steel block 20 and the alnico magnet 21 are formed to be square, and a bolt hole 20a is formed in the steel block 20 and a hole 21a is formed in the alnico magnet 21, respectively. In the state where the alnico magnet 21 and the coil 22 arranged in a concave part 12b are interposed between the steel block 20 and the bottom wall 12c of the clamp plate 12, these are fastened to the clamp plate 12 by a bolt 24 made from a non-magnet material (for example, SUS 304). Multiple permanent magnets 23 are firmly fixed to the steel block 20 and the clamp plate 12 by any fixing means.

As shown in FIG. 6, in the two adjacent magnet units 13, a magnetic pole of the permanent magnet 23 to one steel block 20 and that of the other steel block 20 are opposite. The alnico magnet 21 is designed to reverse its magnetic pole due to a magnetic induction of the magnetic field generated by the coil 22. However, a magnetic pole of the alnico magnet 21 to one steel block 20 and that of the alnico magnet 21 to the other steel block 20 are opposite.

Figure 8:
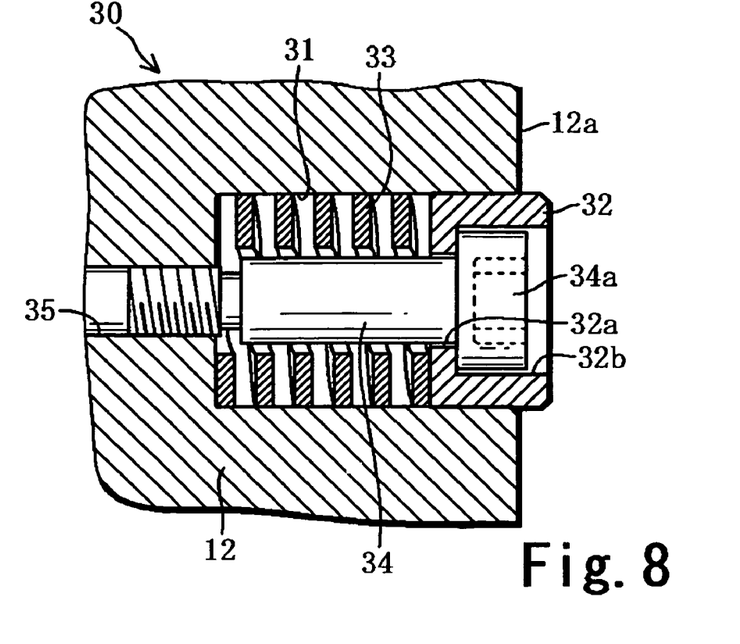
FIG. 8 is a cross sectional view of the air-gap formation mechanism (in the middle of assembly).
Figure 9:
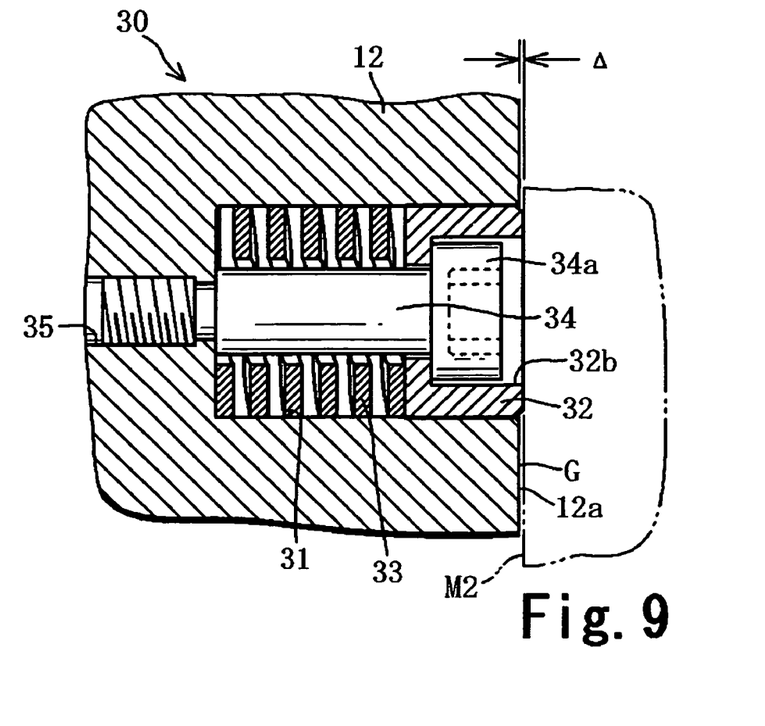
FIG. 9 is a cross sectional view of the air-gap formation mechanism (after assembly).

Next, when detaching the mold M, in the inactive condition of the multiple magnet units 13 (in the condition where the magnetic force generation for fixing the mold M is stopped), an air-gap formation mechanism 30 for forming an air-gap (for example, 0.5 mm to 1.0 mm of thickness) between the fixation surface 12a and the mold M2 in association of movement start of the movable platen 12 will be described. As shown in FIG. 3, FIG. 8 and FIG. 9, the air-gap formation mechanism 30 is incorporated in the clamp plate 12 at a slightly-lower side from the center of the fixation surface 12a in the clamp plate 12.

The air-gap formation mechanism 30 is comprising an accommodation hole 31 formed in the clamp plate 12 so as to open to the fixation surface 12a of the clamp plate 12, compression springs 33 and a bolt 34 as a regulatory member. FIG. 8 shows a state in the middle of incorporating the air-gap formation mechanism 30 into the clamp plate 12 (a condition where the compression spring 33 is free length), and FIG. 9 shows a state where the air-gap formation mechanism 30 is incorporated into the clamp plate 12.

The movable member 32 is formed with a short cylinder body, and comprises a concave portion 32b for accommodating a bolt head part 43a and a bolt hole 32a. The movable member 32 is accommodated in the external ends of the accommodation hole 31 to be slidable toward the shaft center direction, and the circumference at the edge of the movable member 32 is chamfered to be 45 degrees. The compression springs 33 are fitted in an inert part than the movable member 32 within the accommodation hole 31, and elastically energize the movable member 32 toward the fixation surface 12a, i.e. toward the mold M2.

This compression spring 33 is formed with a spiral coil made of a spring steel wire rod having a rectangular cross section, and has a large spring constant. The bolt 34 as a regulatory member is inserted into the movable member 32 and the compression springs 33 and is screwed into a bolt hole 35 of the clamp plate 12, and the head 34a of the bolt 34 is accommodated in the concave portion 32b of the movable member 32 and comes into contact with the bottom surface of the concave portion 32b, and regulates the movable member 32 not to move outward than the position, which projects outward from the fixation surface 12a, by a predetermined length Δ (see FIG. 9) equivalent to the thickness of the air-gap.

As shown in FIG. 9, when the mold M is not fixed, the movable member 32 projects from the fixation surface 12a by the predetermined length Δ (for example, 0.5 mm to 1.0 mm). When the multiple magnet units 13 in the clamp plate 12 are activated and the mold M is adhered by the magnetic force, the movable member 32 is pressed by the mold M and will not project outward from the fixation surface 12a. In this adhered condition, the compression spring 33 exerts, for example, 1,000 N to 1,500 N of elastic force to the mold M. However, the value of this elastic force is merely one example, and it shall not be limited to this value.

Figure 7:
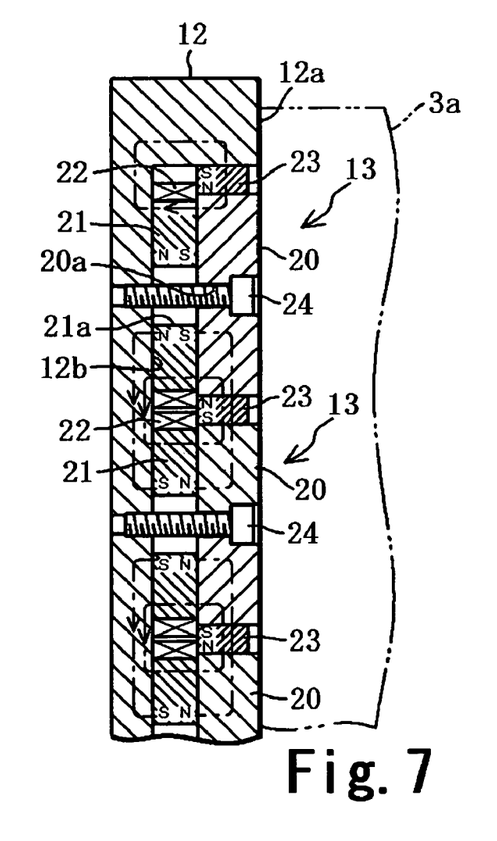
FIG. 7 is a cross sectional view of the clamp plate (inactive condition) of the movable platen.

Next, operation and advantages of the mold fixation devices 10A and 10B of this injection molding machine 1 will be described. First, in the case of fixing the mold M to the fixed platen 2 and the movable platen 3 by the mold fixation devices 10A and 10B, the mold M in the mold-clamped condition is conveyed into between the fixed platen 2 and the movable platen 3 by a conveyance means, such as a crane. At this time, in the condition where the multiple magnet units 13 of the clamp plates 11 and 12 are inactivated as shown in FIG. 7, the mold M is conveyed so as not to be affected due to a magnetic force by the multiple magnet units 13.

Next, the molds M1 and M2 are positioned and come into contact with the fixation surfaces 11a and 12a of the clamp plates 11 and 12 of the fixed platen 2 and the movable platen 3, respectively, and the circular convex portion of the mold M1 is fitted into the location ring 11c of the fixed platen 11, and centering is accomplished.

When the molds M1 and M2 are fixed to the fixation surfaces 11a and 12a of the clamp plates 11 and 12, power is supplied to corresponding magnet units 13 from a control panel by operating an operating panel, and the power is distributed to the coils 22 for several seconds in a predetermined direction, and as shown in FIG. 6, the magnetic pole of the alnico magnet 21 is switched so as to match the direction of the magnetic flux by the alnico magnet 21 with the direction of the magnetic flux by the permanent magnet 23, and a magnetic circuit including the mold M as a portion of the magnetic path is formed. Therefore, the magnetic flux passes through the molds M1 and M2 as shown with a broken line, and the molds M1 and M2 are adhered and fixed to the fixation surfaces 11a and 12a, respectively.

When the mold M2 is fixed to the fixation surface 12a by a magnetic force, because the movable member 32 of the air-gap formation mechanism 30 is pressed by the mold M2, the movable member 32 will no longer project outward from the fixation surface 12a, and the mold M2 becomes in the condition where the elastic energizing force as mentioned above is applied to the mold M2.

When the molds M1 and M2 are fixed to the fixation surfaces 12a and 12a of the clamp plates, respectively, since the power distribution to the coils 22 becomes unnecessary, the power is also not consumed, and even if the power supply is cut off, because the mold adhesion force will not diminish, it excels in the safety.

As described above, while the molds M1 and M2 are fixed to the fixed platen 2 and movable platen 3, the movable platen 3 is driven to move toward the direction to come closer/separate to/from the fixed platen 2, respectively, and the mold-shutting or mold-opening of the molds M1 and M2 are accomplished. While the molds M1 and M2 are shut, a molten synthetic resin is injected into the cavity within these molds M1 and M2 from the injection mechanism 6 and an article is molded, and then, the molds M1 and M2 are opened and the molded article is ejected by the ejector mechanism 7.

In the meantime, when fixation of the molds M1 and M2 is released from the fixation surfaces 11a and 12a of the clamp plates 11 and 12, respectively, power is supplied to corresponding magnet units 13 from the control panel by operating the operating panel, and power is distributed to the coils in a direction, which is opposite from that in the case of fixing the molds M1 and M2, and as shown in FIG. 7, the magnetic pole of the alnico magnet 21 is reversed and the alnico magnets 21 become inactivated, and magnetic fluxes by the alnico magnets 21 will be no longer generated from the fixation surfaces 11a and 12a, and a magnetic force is no longer applied to the molds M1 and M2.

Even if the fixation is released, a force to adhere the molds M1 and M2 to the fixation surfaces 11a and 12a is applied by a residual magnetic flux. However, since the movable member 32 of the air-gap formation mechanism 30 exerts a stronger pressing force to the mold M2 than the adhesion force by the residual magnetic flux, an air-gap G, which is equal to the predetermined length Δ, is automatically formed between the mold M2 and the fixation surface 12a in association with the movement start toward the mold-opening direction of the movable panel 12. When this air-gap G is formed, because the magnetic path of the residual magnetic flux is cut off by the air-gap G, the adhesion force by the residual magnetic flux becomes very small. Once in this condition, since only the adhesion force by the residual magnetic flux is applied from the clamp plate 11 of the fixed platen 2, the molds M1 and M2 hung by the crane can be easily detached from the clamp plate 11 of the fixed platen 2.

Here, an example where Embodiment 1 is partially modified will be described.

[1] In Embodiment 1, one air-gap formation mechanism 30 is provided in the clamp plate 12. However, multiple air-gap formation mechanisms 30 may be provided to the clamp plate 12, if necessary, according to the size of the mold M and the number of the magnet units 13, and one or more air-gap formation mechanisms 30 may be provided to the clamp plate 12 of the fixed platen 2.

[2] The configuration of the magnet units 13 in Embodiment 1 shows one example, but it shall not be limited to this configuration, and even when various forms of magnetic force generation mechanisms are provided to the clamp plates, the present invention can be applied.

[3] The air-gap formation mechanism 30 is configured such that the movable member 32 is pressed by the elastic energizing force of the compression springs 33. However, it is also possible to be configured that an air pressure of the pressurizing air is received by the movable member 32 and the movable member 32 is pressed. However, in this case, an air passage is formed to the movable platen 3 and the clamp plate 12, and the air passage is joined to a pressurizing air supply means.

Figure 10:
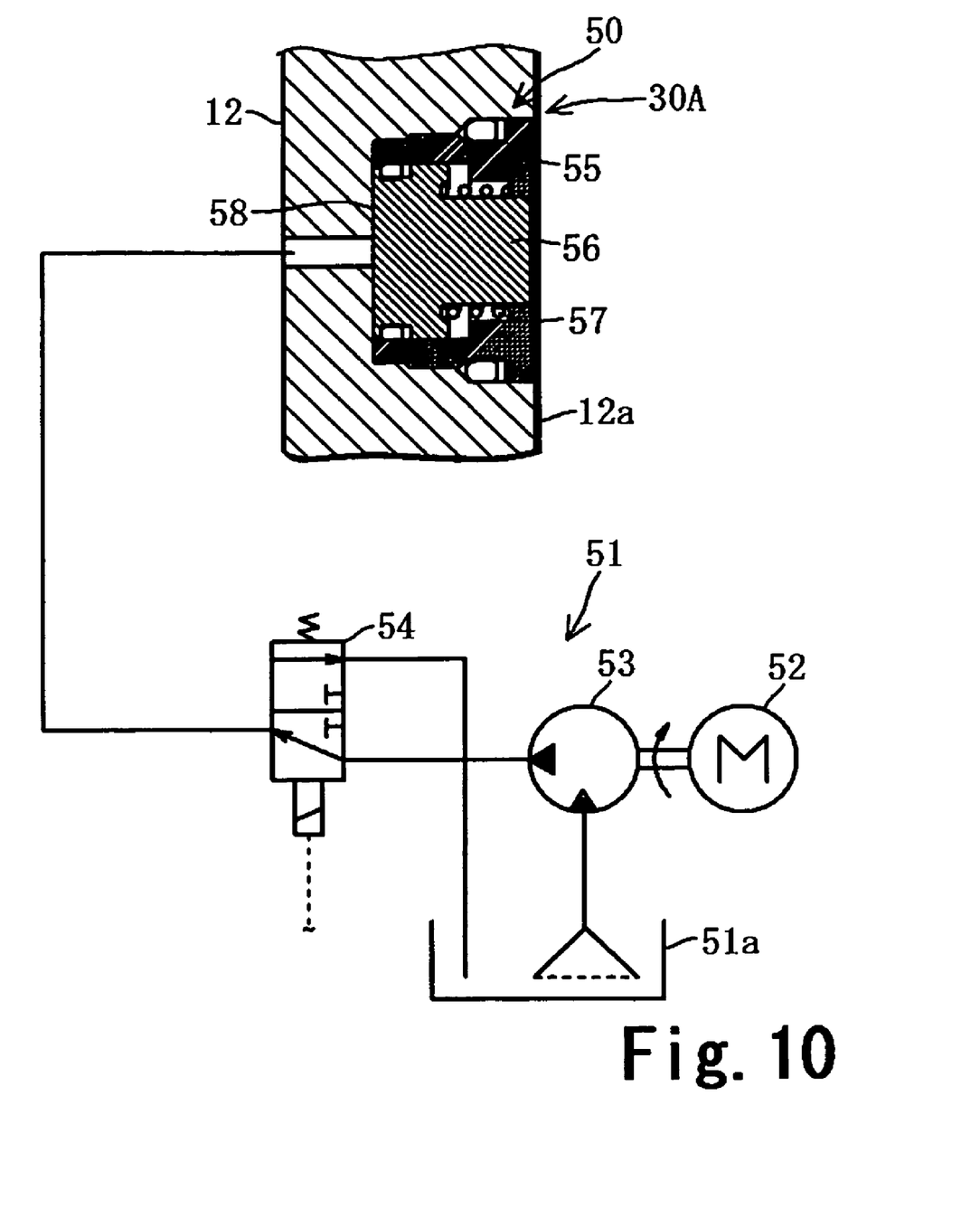
FIG. 10 is a cross sectional view of the modified air-gap formation mechanism connected to a hydraulic supply system.

Instead of the air-gap formation mechanism 30, a hydraulic air-gap formation mechanism 30A as described below may be adopted. As shown in FIG. 10, the air-gap formation mechanism 30A has a hydraulic cylinder 50 incorporated into the clamp plate 12, and a hydraulic supply system 51 supplying hydraulic pressure to this hydraulic cylinder 50. The hydraulic supply system 51 has a hydraulic pump 53 driven by an electric motor 52, an electromagnetic direction switching valve 54 and an oil tank 51a. The hydraulic cylinder 50 has a cylinder body 55, a piston member 56 and a compression spring 57 energizing this piston member 56 to the retracted position.

A hydraulic activation chamber 58 is connected to the hydraulic supply system 51, and when hydraulic pressure is supplied to the hydraulic activation chamber 58, the piston member 56 is switched to the exit position where the end part of the piston 56 projects from the fixation surface 12a of the clamp plate 12 by approximately 3 mm, and an air-gap (not shown) is formed between the fixation surface 12a and the mold M2. When the hydraulic pressure of the hydraulic activation chamber 58 is drain pressure, the piston member 56 is switched to the recessed position from the fixation surface 12a.

The electromagnetic direction switching valve 54 is controlled by a controller (not shown) for controlling the multiple magnet units 13, and when power is distributed to the multiple magnet units 13 for several seconds in order to release the fixation of the mold M or immediately after the power distribution, the electromagnetic direction switching valve 54 is automatically switched to the illustrated supply position, and hydraulic pressure is supplied to the hydraulic cylinder 50. Furthermore, instead of the hydraulic supply system 51, it may be configured to supply the hydraulic pressure to the hydraulic cylinder 50 from a small-sized accumulator where pressuring oil with predetermined pressure is contained. In this case, as similar to the air-gap formation mechanism 30, when the multiple magnet units 13 become inactivated, an air-gap can be automatically formed between the fixation surface 12a and the mold M2 by the pressuring force of the hydraulic cylinder 50.

[4] Other than the above-mentioned, it will be obvious to those skilled in the art that various changes may be added to Embodiment 1 without departing from the scope of the invention.

Embodiment 2

Next, an injection molding machine 1A relating to Embodiment 2 will be described based upon FIG. 11 to FIG. 14. Since this injection molding machine 1A is equipped with the fixed platen 2, the movable platen 3, the clamp plate fixed to the fixed platen 2, the clamp plate 12 fixed to the movable platen 3 and the multiple magnet units 13 as similar to the injection molding machine 1, the same component members as the injection molding machine 1 are marked with the same symbols, respectively, and the description will be omitted, and only different components will be described.

This injection molding machine 1A is equipped with a conveyor mechanism (not shown) for conveying the mold M between the fixed platen 2 and the movable platen 3, and multiple first and second in-platen rollers 40 and 41, and an air-gap formation mechanism 30B utilizing these first and second in-platen rollers 40 and 41 is formed.

Figure 11:
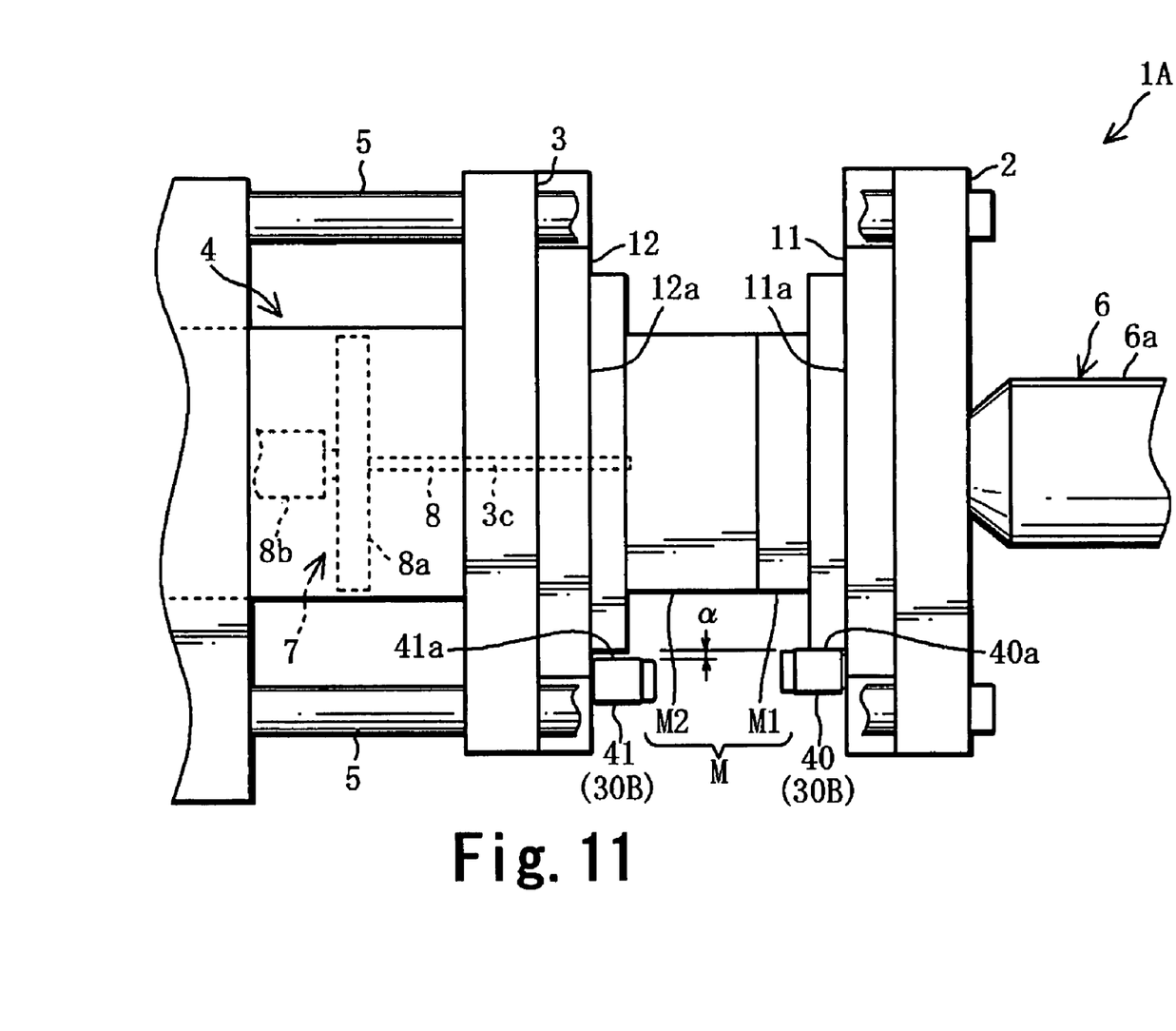
FIG. 11 is a front view of the main part of the injection molding machine and a joined mold of Embodiment 2.
Figure 12:
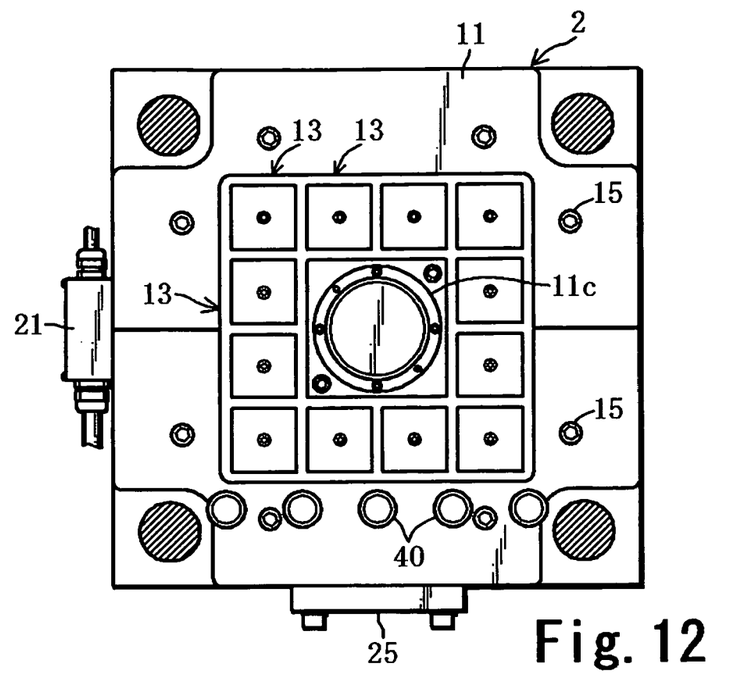
FIG. 12 is a side view of the fixed platen and the clamp plate.

As shown in FIGS. 11 and 12, the multiple (for example, five) first in-platen rollers 40 for mold conveyance projecting outward from the fixation surface 11a are provided on the lower portion of the clamp plate 11 mounted in the fixed platen 2. The conveyance surfaces 40a of the multiple first in-platen rollers 40 are horizontal, and the first in-platen roller 40 is configured such that the cylindrical roller is mounted onto a horizontal axial member, which is perpendicularly screwed and fixed to the clamp plate 11, via a radial bearing, and the roller body is positioned and restricted to the axial member.

Figure 13:
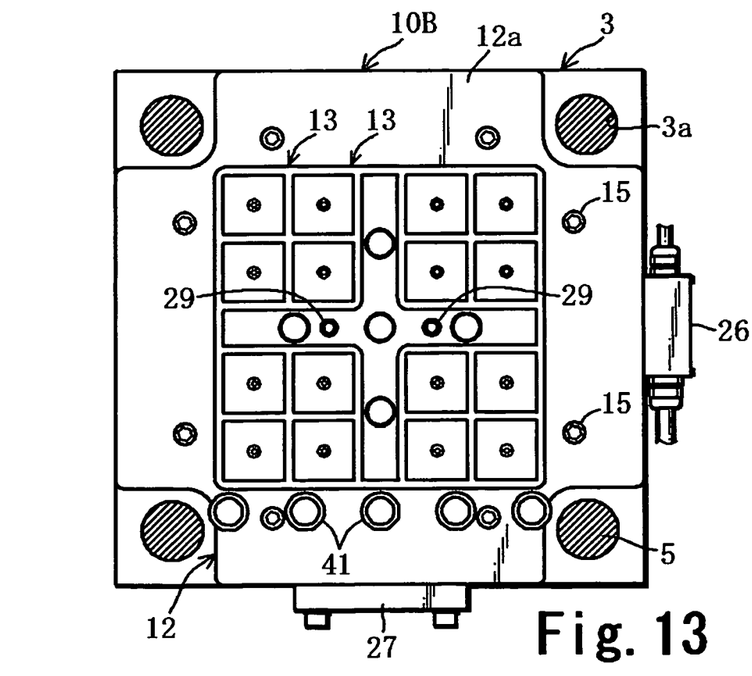
FIG. 13 is a side view of the movable platen and the clamp plate.

Similarly, as shown in FIG. 11 and FIG. 13, the multiple (for example, five) second in-platen rollers 41 for mold conveyance projecting outward from the fixation surface 12a are provided on the lower portion of the clamp plate 12 mounted in the movable platen 3. The conveyance surfaces of the multiple second in-platen rollers 41 are horizontal, and the second in-platen roller 41 is configured the same as the first in-platen roller 40. The conveyance surface 41a of the second in-platen rollers 41 is set lower than the conveyance surface 40a of the first in-platen rollers 40 by a predetermined small distance (for example, 0.5 mm to 1.0 mm).

The air-gap formation mechanism 30B has a configuration where the conveyance surface of the second in-platen rollers 41 is set lower than the conveyance surface of the first in-platen rollers 40 by the predetermined small distance a; and is configured such that while the plurality of magnet units 13 are inactive in order to remove the mold M from the fixation surfaces 11a and 12a, air-gaps G1 and G2 are automatically formed between both the fixation surfaces 11a and 12a and the mold M via the mold's own weight in association with the movement start of the movable platen 3.

When conveying the mold M into between the fixed platen 2 and the movable platen 3, the movable platen 3 is slightly opened, and the mold M is conveyed to close to the injection molding machine 1A by the conveyor mechanism provided in front of the injection molding machine 1A, and then, both flanges of the mold M are supported by the first and second in-platen rollers 40 and 41, and the mold M is transferred on the first and second in-platen rollers 40 and 41 and conveyed into between the fixed platen 2 and the movable platen 3, and then, the mold M is inserted between the fixed platen 2 and the movable platen 3. Next, the circular convex part of the mold M is fitted into the location ring 11c of the clamp plate 11 and the mold M is positioned, and the movable platen 3 is moved toward the mold-clamping direction at maximum.

Next, the plurality of magnet units 13 of the clamp plates 11 and 12 are switched to an active condition, and the mold M1 is fixed to the clamp plate 11 by the magnetic force of the multiple magnet units 13; concurrently, the mold M2 is fixed to the clamp plate 12 by the magnetic force of the multiple magnet units 13. When the molds M1 and M2 are fixed to the clamp plates 11 and 12, respectively, the flange of the mold M1 makes contact with a part of the conveyance surfaces 40a of the first in-platen rollers 40. However, the flange of the mold M2 slightly floats from the conveyance surfaces of the second in-platen rollers 41. Then, injection molding is executed by the desired count of times using the molds M1 and M2.

Figure 14:
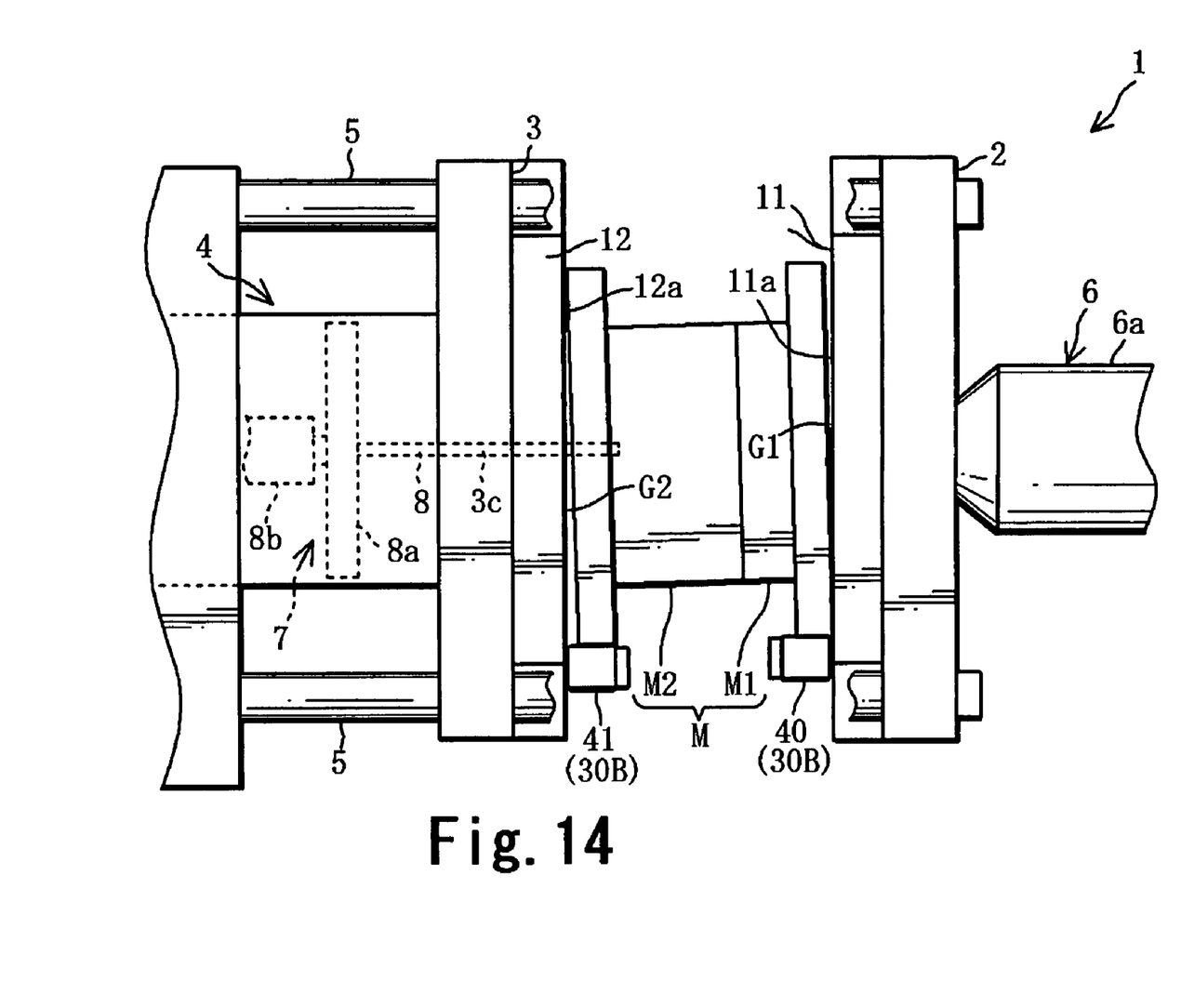
FIG. 14 is a front view of the main part of the injection molding machine and the molds when removing the molds.

After the injection molding is completed, when the integrated mold M is detached from the fixation surfaces 11a and 12a, after power is distributed to the multiple magnet units 13 (magnetic force generation mechanisms) to the fixation release direction for several seconds and become inactivated, if the movable platen 3 is slightly moved toward the mold-opening direction, as shown in FIG. 14, the mold M becomes in a tilted posture so as to be lower at the movable platen 3 side due to the mold's own weight in association with the movement start, and both flanges of the mold M are supported by the first and second in-platen rollers 40 and 41, and the air-gaps G1 and G2 (for example, 0.5 mm to 1.0 mm of thickness) are automatically formed between the both fixation surfaces 11a and 12a and the mold M.

As a result, as similar to the case of the injection molding machine 1, the magnetic path of the residual magnetic flux continuing into the mold M is cut off by the air-gaps and the magnetic force to adhere the mold M becomes no longer effective, the mold M is smoothly transferred on the first and second in-platen rollers 40 and 41, and can be carried out of the injection molding machine 1A.

Furthermore, the size, arrangement and structure of the first and second in-platen rollers 40 and 41 of Embodiment 2 are merely one example, and this embodiment can be implemented with a mode where modification is appropriately added.

Other than those, it will be obvious to those skilled in the art that various changes may be added to Embodiment 2 without departing from the scope of the invention.

INDUSTRIAL APPLICABILITY

The present invention is applicable to various injection molding machines where clamp plates having magnetic force generation mechanisms for fixing the molds are attached, and productivity when detaching the molds can be improved.

What is claimed is:

1. An injection molding machine, comprising:
   a fixed platen and a movable platen for fixing a pair of molds;
   a pair of clamp plates mounted to the fixed platen and the movable platen, respectively, and having a fixation surface for mold fixation, respectively;
   magnetic force generation mechanisms for generating a magnetic force for fixing the molds to the fixation surfaces; and
   an air-gap formation mechanism being provided at least in one of the clamp plates, said air-gap formation mechanism being configured to be operable for automatically forming an air-gap between the fixation surface and the molds in association with a movement start of the movable platen while the magnetic force generation mechanisms are inactivated for detaching the molds from the fixation surfaces.

2. The injection molding machine according to claim 1, wherein:
   the air-gap formation mechanism is provided in the clamp plate mounted to the movable platen.

3. The injection molding machine according to claim 1 or 2, wherein the air-gap formation mechanism comprises:
   an accommodation hole formed in the clamp plate so as to open to the fixation surface of the clamp plate;
   a movable member fitted movably in the accommodation hole;
   a compression spring that is fitted within the accommodation hole farther inward from the fixation surface than said movable member, and that elastically biases the movable member toward the fixation surface; and
   a regulatory member for regulating the movable member so as not to move outward from a position projecting by a predetermined length equivalent to the air-gap.

4. The injection molding machine according to claim 3, wherein:
   the regulatory member is formed with a bolt that inserts into the movable member and the compression spring and is screwed to the clamp plate; and
   a head of the bolt is accommodated in a concave part formed in the movable member.

5. The injection molding machine according to claim 1, wherein:
   multiple first in-platen rollers for mold conveyance projecting outward from the fixation surface are provided on a lower portion of the clamp plate mounted to the fixed platen;
   multiple second in-platen rollers for mold conveyance projecting outward from the fixation surface are provided on a lower portion of the clamp plate mounted to the movable platen; and
   the air-gap formation mechanism has a configuration where conveyance surfaces of the second in-platen rollers are set lower than conveyance surfaces of the first in-platen rollers by a predetermined distance such that while the magnetic force generation mechanisms are inactivated, air-gaps are automatically formed between both fixation surfaces and the molds via a weight of the molds.

6. The injection molding machine according to claim 3, wherein:
   said compression spring is configured for biasing said movable member toward the fixation surface with a spring force sufficient to urge the molds away from the fixation surface against a residual magnetic flux remaining when the magnetic force generation mechanisms are inactivated.

7. An injection molding machine, comprising:
   a fixed platen and a movable platen for fixing a pair of molds;
   a pair of clamp plates mounted to the fixed platen and the movable platen, respectively, and having a fixation surface for mold fixation, respectively;
   magnetic force generation mechanisms for generating a magnetic force for fixing the molds to the fixation surfaces; and
   an air-gap formation mechanism being provided at least in one of the clamp plates, said air-gap formation mechanism being configured to be operable for automatically forming an air-gap between the fixation surface and the molds in association with a movement start of the movable platen while the magnetic force generation mechanisms are inactivated for detaching the molds from the fixation surfaces, said air-gap formation mechanism being configured for exerting a biasing force against the fixation surface, said biasing force being sufficient to urge the molds away from the fixation surface against a residual magnetic flux remaining when the magnetic force generation mechanisms are inactivated.

* * * * *